United States Patent
Geisinger

(10) Patent No.: US 7,080,352 B2
(45) Date of Patent: Jul. 18, 2006

(54) METHOD AND SYSTEM FOR CREATING PROGRAMS USING CODE HAVING COUPLED SYNTACTIC AND SEMANTIC RELATIONSHIPS

(75) Inventor: Nile Josiah Geisinger, Petaluma, CA (US)

(73) Assignee: dLoo, Incorporated, Alameda, CA (US)

( * ) Notice: Subject to any disclaimer, the term of this patent is extended or adjusted under 35 U.S.C. 154(b) by 353 days.

(21) Appl. No.: 10/060,433

(22) Filed: Jan. 30, 2002

(65) Prior Publication Data

US 2003/0145308 A1    Jul. 31, 2003

(51) Int. Cl.
*G06F 9/44* (2006.01)
*G06F 9/45* (2006.01)

(52) U.S. Cl. ............... 717/106; 717/142; 717/143; 717/144

(58) Field of Classification Search ........ 717/142–145, 717/108, 136, 116, 137, 153, 104, 106, 140, 717/146, 107, 141; 707/10, 103 R; 715/771; 700/103
See application file for complete search history.

(56) References Cited

U.S. PATENT DOCUMENTS

| | | | |
|---|---|---|---|
| 4,686,623 A * | 8/1987 | Wallace ..................... 717/143 |
| 4,931,928 A * | 6/1990 | Greenfeld .................. 717/131 |
| 4,943,932 A | 7/1990 | Lark et al. |
| 5,553,282 A * | 9/1996 | Parrish et al. .............. 707/10 |
| 5,640,546 A | 6/1997 | Gopinath et al. |
| 5,748,966 A * | 5/1998 | Sato ........................... 717/131 |
| 5,758,160 A | 5/1998 | McInerney et al. |
| 5,838,980 A * | 11/1998 | Guillen et al. ............. 717/143 |
| 5,907,847 A * | 5/1999 | Goldberg ................ 707/103 R |
| 6,078,744 A * | 6/2000 | Wolczko et al. ............ 717/153 |
| 6,097,888 A * | 8/2000 | Simonyi ..................... 717/144 |
| 6,173,290 B1 * | 1/2001 | Goldberg ................ 707/103 R |
| 6,182,281 B1 * | 1/2001 | Nackman et al. .......... 717/116 |
| 6,226,692 B1 | 5/2001 | Miloushev et al. |
| 6,275,976 B1 | 8/2001 | Scandura |
| 6,292,810 B1 * | 9/2001 | Richards .................... 715/503 |
| 6,366,300 B1 * | 4/2002 | Ohara et al. ................ 715/771 |
| 6,381,743 B1 * | 4/2002 | Mutschler, III ............ 717/104 |
| 6,385,769 B1 * | 5/2002 | Lewallen .................... 717/125 |
| 6,477,439 B1 * | 11/2002 | Bernaden et al. .......... 700/103 |
| 6,505,342 B1 * | 1/2003 | Hartmann et al. ......... 717/104 |
| 6,542,899 B1 * | 4/2003 | Saulpaugh et al. ..... 707/103 R |
| 6,601,233 B1 * | 7/2003 | Underwood ............... 717/102 |
| 6,691,201 B1 * | 2/2004 | Williams et al. ........... 710/315 |
| 6,748,585 B1 * | 6/2004 | Proebsting et al. ........ 717/136 |
| 6,754,884 B1 * | 6/2004 | Lucas et al. ............... 717/108 |
| 6,901,579 B1 * | 5/2005 | Suguta ....................... 717/108 |
| 6,966,054 B1 * | 11/2005 | Simonyi ..................... 717/144 |
| 6,985,900 B1 * | 1/2006 | Codd et al. ..................... 707/6 |
| 6,986,102 B1 * | 1/2006 | Baer et al. .................. 715/514 |

(Continued)

OTHER PUBLICATIONS

TITLE: Microsoft Press Computer Dictionary, Third Edition, Published on 1997.*

(Continued)

*Primary Examiner*—Chameli C. Das
(74) *Attorney, Agent, or Firm*—Blakely, Sokoloff, Taylor, Zafman

(57) ABSTRACT

A new fundamental unit of programming which couples semantic and syntactic relationships, and a system for compiling those units and programs written in those units. A Sym is comprised of a Name, an Inherit Statement, a Self Description, and a Definition. Syms couple syntactic and semantic relationships through their use of Syntactic References in their Self Description and Semantic References in their Definition. Syms and programs written in Syms are compiled through the Sym Execution System.

15 Claims, 10 Drawing Sheets

U.S. PATENT DOCUMENTS 6,996,803 B1* 2/2006 Sakamoto et al. .......... 717/109

OTHER PUBLICATIONS

TITLE: Implementation of a Compiler for a semantic Data Model: Experiences with taxis, author: Nixon et al, ACM, 1987.*

TITLE: Syntax and Semantics of a Persistent Common Lisp, author: Jacobs et al, ACM 1994.*

TITLE: Handling context-Sensitive Syntactic Issues in the Design of a Front-end for a MATLAB compiler, author: Joisha et al, ACM, 2001.*

TITLE: Platform Independent Translations for a Compliable Ada Abstract Syntax, author: Ferguson et al, ACM, 1993.*

Camarao, Carlos and Figueiredo, Lucilia. A Monadic Combinator Compiler. Paper. From the Software Practice and Experience Conference. Feb. 2, 2001. Curitaba, Brazil.

Dijkstra, Edsger W. Go To Statement Considered Harmful. Paper. Communications of the ACM. Mar. 1968. pp. 147-148. vol. 11, No. 3.

Gamma, Helm, Johnson, and Vlissides. Design Patterns: Elements of Reusable Object-Oriented Software. Book. 1995. pp. 1-31. Addison-Wesley. Reading, MA, USA.

Geisinger, Nile J. The Word Model: A New Technology To Integrate Diverse Problem Domains. Paper. Mar. 30, 2001. Kuroshin, an online forum. http://www.kuro5hin.org/story/2001/3/22/17451/3912.

Geisinger, Nile J. The Word Model: A Detailed Explanation. Paper. Mar. 26, 2001. Kuroshin, an online forum. http://www.kuro5hin.org/story/2001/3/23/17959/2000.

Geisinger, Nile J. An Introduction to Word Oriented Programming with BlueBox. Paper. Aug. 13, 2001. Linux.com, an online magazine. http://www.linux.com/develop/newsitem.phtml?aid=12494&sid=126&page=1.

Hutton, Graham and Meijer, Erik. Monadic Parser Combinators. Paper. 1996. Technical Repot NOTTCS-TR-96-4. Dept. of Computer Science, University of Nottingham, England.

Lakos, John. Large-Scale C++ Software Design. Book. 1996. pp. 1-18. Addison-Wesley. Mexico City, Mexico.

Lounden, Kenneth C. Programming Langauges Principles and Practice. Book. 1993. pp. 194-210. PWS Publishing Company. Boston, MA, USA.

Meyers, Scott. Effective C++: 50 specific ways to improve your programs and designs. Book. 1998. pp. 79-83, 117-122, 143-152, 216-219. Addison-Wesley. Reading, MA, USA.

Riel, Arthur J. Object-Oriented Design Heuristics. Book. 1996. pp. 29-32. Addison-Wesley. Harlow, England.

* cited by examiner

METHOD AND SYSTEM FOR CREATING PROGRAMS USING CODE HAVING COUPLED SYNTACTIC AND SEMANTIC RELATIONSHIPS

CROSS-REFERENCE TO RELATED APPLICATIONS

Not applicable.

STATEMENT REGARDING FEDERALLY SPONSORED RESEARCH

Not applicable.

REFERENCE TO A COMPUTER PROGRAM LISTING

By way of example, an implementation of one embodiment of the invention is included as source code on an accompanying CD-ROM.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND OF THE INVENTION

1. Field of the Invention

This invention relates to a method for creating computer programs. More specifically, the present invention relates to programming models and frameworks that are designed to facilitate and enforce the creation of scalable computer programs.

2. Description of the Related Art

Side effects and scalability issues have been constant problems in computer science since the inception of the discipline. In the past, scalability problems, i.e., problems arising from creating, maintaining, and improving large computer programs, have been solved by coupling different elements together to form new fundamental units of programming. The transition from unstructured to structured programming and from structured programming to object-oriented programming are examples of this approach. Today, related art in the field has concentrated on improving the composition of objects through data-flow systems, loose coupling of interfaces, design patterns, and frameworks for scalable network software.

Programmers initially encountered scalability problems with unstructured programming languages. Programs written with unstructured languages like Basic or Cobol execute a series of instructions linearly until the computer comes to a jump or goto instruction. The computer then jumps to another part of memory and starts executing code there. As explained in Edgar Dijkstra's paper "Go To Statement Considered Harmful", because the flow control of a program jumps from place to place with no set structure, it is impossible to guarantee that a call to a set of instructions will return rather than following a different execution path.

The undesirable side effects that can be produced by unintentionally following an execution path make it extremely difficult to scale unstructured programs. The solution to this problem, which can be found in Kenneth Louden's "Programming Languages: Principles and Practices" is to force calls to code to have a single entry and exit point. Popular structured programming languages, like C and Pascal, forbid the goto and jump instructions of unstructured languages and eliminate the side effects of the unstructured model.

But structured programming languages also have scalability problems. Because variables in structured languages can have dozens of functions depending on them for their operations, changing the value of a single variable can have unintended side effects on any of the methods in a program. This hinders reuse and cripples scalability because it is impossible to guarantee that new functions will not have unintended side effects on data and other existing functions. "Object Oriented Design Heuristics" by Arthur J. Riel explains how this scalability problem is solved via the object, a unit of programming that couples data and methods.

In the past decade, the latest developments in building scalable computer programs have focused on monadic combinators in functional programming languages and improving how objects in object-oriented systems are composed. Monadic combinators, which are the closest related art, offer a scalable method for building parsers in functional languages like Haskell. Monadic combinators can be composed out of other monadic combinators and their results can be composed to perform calculations.

Outside of academia, the majority of work in the field has concentrated on components, which make it easy to create reusable objects. Loose interface coupling, whether by reading component signatures or using design patterns like abstract factories, are also widely used. Systems that aid programmers in constructing proofs that programs are correct and architectures for integrating diverse components are also popular.

These new contributions do not replace the object with a new fundamental unit, but instead provide frameworks or specially designed objects for solving common scalability problems in object-oriented software development. As a result, the popular programming languages in use today and the problems that attend them have not changed substantially since the introduction of object-oriented programming thirty years ago. In particular, the scalability problems that arise from the lack of coupling between syntactic and semantic relationships in object-oriented programming have not been addressed. Therefore, the need exists for a new programming model based on a new fundamental unit of programming that couples syntactic and semantic relationships and solves the scalability problems faced by today's programmers.

BRIEF SUMMARY OF THE INVENTION

It is an object of the invention to make it easier to reuse the source code of software.

It is another object of the invention to make it easier to create and modify large systems of software.

It is another object of the invention to make it possible to construct software out of code with coupled syntactic and semantic relationships.

The present invention is a method for generating executable code for computer programs and a model for a programming language. The invention eliminates syntactic side effects common to computer programs by coupling together syntactic and semantic relationships in units called Syms. In other literature produced by the applicant and cited in the accompanying information disclosure statement, Syms are referred to as Words or Symbols. This coupling, like the coupling between data and methods in object-oriented programming, is created through the establishment of bidirectional relationships between syntactic and semantic relationships. The principal advantage of the invention is that it makes it easier to construct, integrate, maintain, comprehend, and improve software.

In one embodiment, the Sym is comprised of a Name, an Inherit Statement, a Self Description, and a Definition. The Name provides a unique identifier to each Sym, and provides a basis for referencing that Sym. The Inherit statement specifies what other Syms a Sym should inherit from and the order of that inheritance. The Self Description matches data and Syms, and establishes syntactic relationships between one or more Syms and pieces of data. The Definition establishes what a Sym means in terms of programming code or other Syms, and creates semantic relationships through code.

Executable code is generated from a Sym or a program written in Syms by the Sym Execution System. In one embodiment, the Sym Execution System is comprised of a Hasher, an Inheritance System, a Matching System, a Polymorphic Sym Matcher, a Definition Translator and a Receiver, Action, and Modifier Sym System. The Hasher uses a Sym's Name or Pattern to determine where to store the Sym. The Inheritance System determines what Syms a Sym inherits from. The Matching System uses a Sym's Self Description to match the Sym against a program. The Polymorphic Sym Matcher determines what child Syms inherit from the parent Sym being compiled and then generates the code to match those child Syms when the parent Sym is matched. The Receiver, Action, and Modifier Sym System creates all of the additional code and performs all of the additional checks needed for specialized types of Syms.

BRIEF DESCRIPTION OF THE DRAWINGS

The accompanying drawings, which are incorporated in and form a part of this specification, illustrate embodiments of the invention and, together with the description, serve to explain the principles of the invention, wherein.

DETAILED DESCRIPTION OF THE INVENTION

Figure 1:
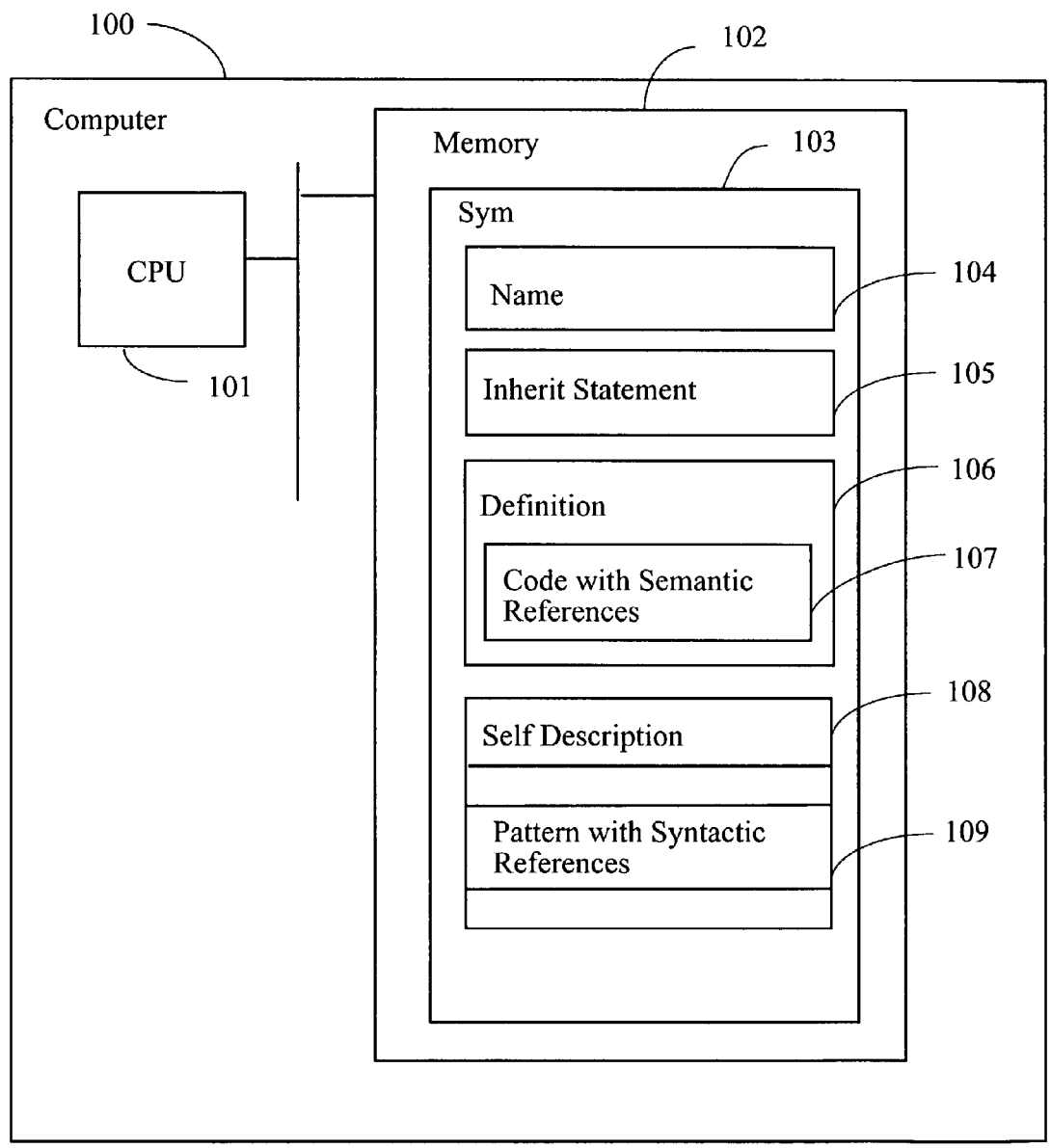
FIG. 1 is a block diagram of a computer system incorporating an embodiment of the present invention.

Preface. In this section, we present a detailed description of the invention, including examples from the drawings. While the description of the invention will be presented here, it will be understood that this description is not intended to limit the invention. On the contrary, the invention presented here is intended to cover alternatives, modifications, and equivalents, which may be included within the spirit and the scope of the invention as defined in the claims.

Definitions. The term bidirectional relationship is defined for the purposes of this document as a relationship between two elements of code across a codebase, such that, given the properties of one element of code in the codebase, the location of the other element in the codebase can be determined. In object-oriented programming, for example, programmers can find the data used by a method by looking in the method's class and can find the methods that use a piece of data by looking in the data's class. Since object-oriented languages enforce this method of finding dependencies by coupling data and methods in classes, data and methods are in a bidirectional relationship in object-oriented programming.

The term coupled is defined for the purposes of this document as two elements of code that are in a bidirectional relationship. By this definition, data and methods are coupled in object-oriented programming.

The term contiguous is defined for the purposes of this document as being in the same section of memory or in a related group of memory locations. A contiguous, bidirectional relationship, for example, means that elements of code are located in the same section of memory or in a related group of memory locations. In the object-oriented language C++, for example, there is a contiguous, bidirectional relationship between data and methods because they are found in the same group of class files commonly referred to as the interface and implementation of a class.

The term semantic relationship is defined for the purposes of this document as the meaning of the syntactic relationships in a program. For example, in a calculus program, the semantic relationships would define the meaning of different combinations of numbers and mathematical operators.

The term state-based is defined for the purposes of this document as code that can be referenced after its initial execution and programmatically manipulated to change its state when it is referenced again. Monadic combinators, by this definition, are not state-based because after a monadic combinator executes its code, it can not be programmatically manipulated. Classes, by this definition, are state-based because after they are instantiated it is possible to change their properties and call their methods.

The term syntactic relationship is defined for the purposes of this document as the legal ways that programming elements can be related to each other. For example, in a calculus program, the syntactic relationships would define the legal ways that numbers and mathematical operators could be combined.

The term unidirectional relationship is defined for the purposes of this document as two programming elements that are not bidirectionally related.

Overview. Programs have both syntactic and semantic relationships between different sections of their code. The syntactic relationships in the code define the legal ways that elements can be related to each other while the semantic relationships define what those relationships mean. In traditional programming models, there is a spaghetti-like relationship between these sets of relationships, which severely limits the reusability and scalability of software.

Object-oriented programming, for example, couples data and methods into a unit known as an object. In object-oriented programming, there is only a unidirectional relationship between syntactic and semantic relationships. Introducing new code with additional syntactic relationships into a codebase can have unintended semantic side effects anywhere in the codebase. As a result, the scalability of object-oriented programming and object-oriented programs is a function of the size of the codebase.

A solution to this problem in the prior art can be found in functional programming, but the solution has limitations. Monadic combinators couple syntactic and semantic relationships, but monadic combinators are stateless programming units. The process by which the coupling in monadic programming occurs only provides access to the results of a monadic combinator's code, rather than the code itself or any data that was changed as a result of the monadic combinator having run. In addition, since monadic combinators use the same representation for both syntactic and semantic relationships rather than using separate syntactic and semantic references, it is not currently possible to inherit syntactic and semantic relationships or polymorphically match code.

The present invention introduces Sym-oriented programming, which solves the scalability problems of the object model by coupling state-based syntactic and semantic relationships. In one embodiment, Syms separate the use and representation of syntactic and semantic references. In one embodiment, the unit is state-based and the bidirectional coupling of the syntactic and semantic relationships is enforced and contiguous. In alternative embodiments, the unit is not state-based, or the representations are not separated, or the coupling between relationships is simply bidirectional, or the coupling between relationships is not enforced.

Sym-oriented programming conveys all of the benefits of object-oriented programming while additionally providing the benefit of simultaneously guaranteeing that whenever a syntactic relationship changes, programmers will have a method by which they can find the semantic relationships that depend upon it. In one embodiment, the syntactic and semantic relationships are coupled in a single file, which guarantees that all dependencies are in a single file. The result is software that is easier to integrate, maintain, comprehend, and improve.

Figure 3:
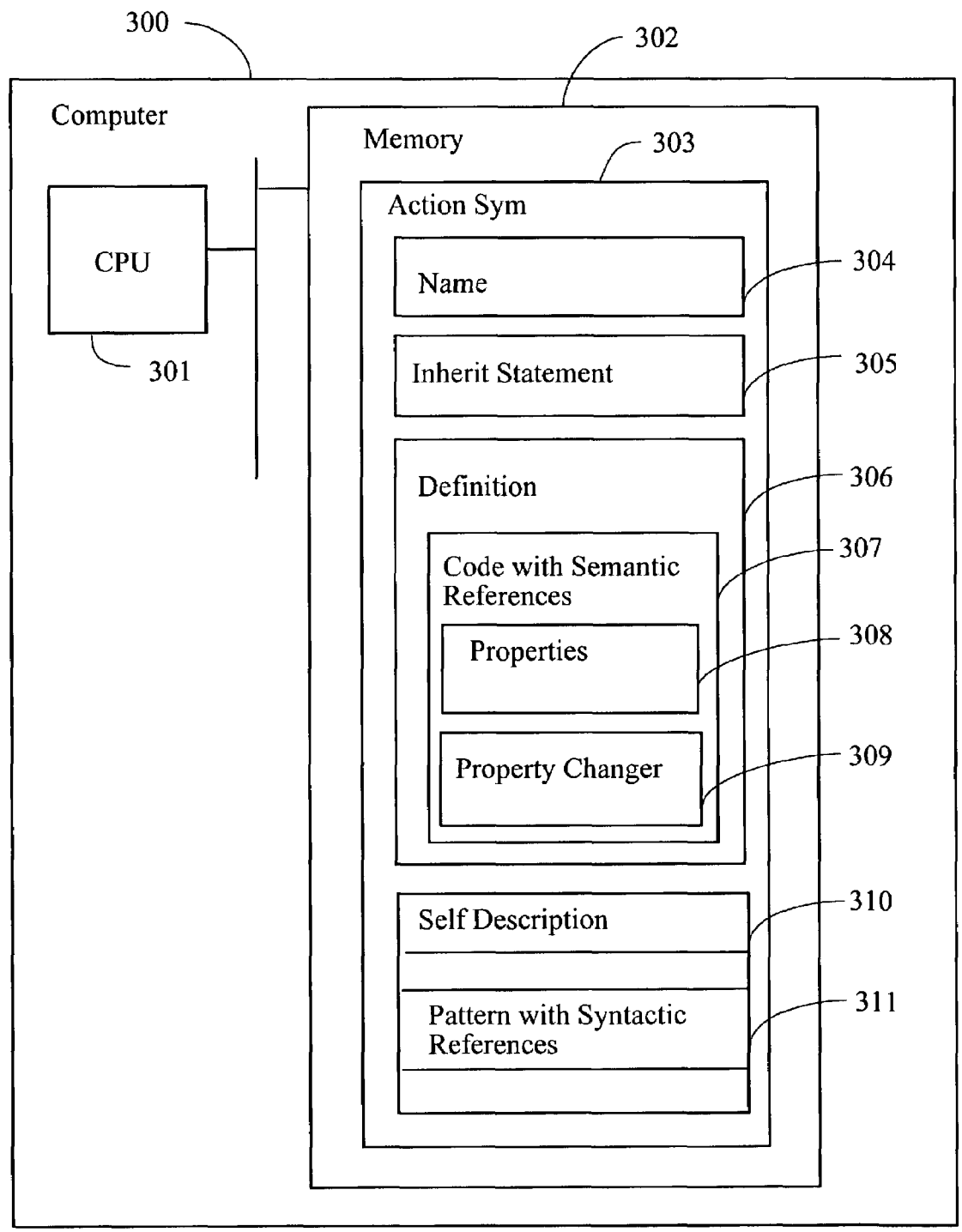
FIG. 3 is a block diagram of a computer system incorporating an embodiment of an Action Sym.
Figure 4:
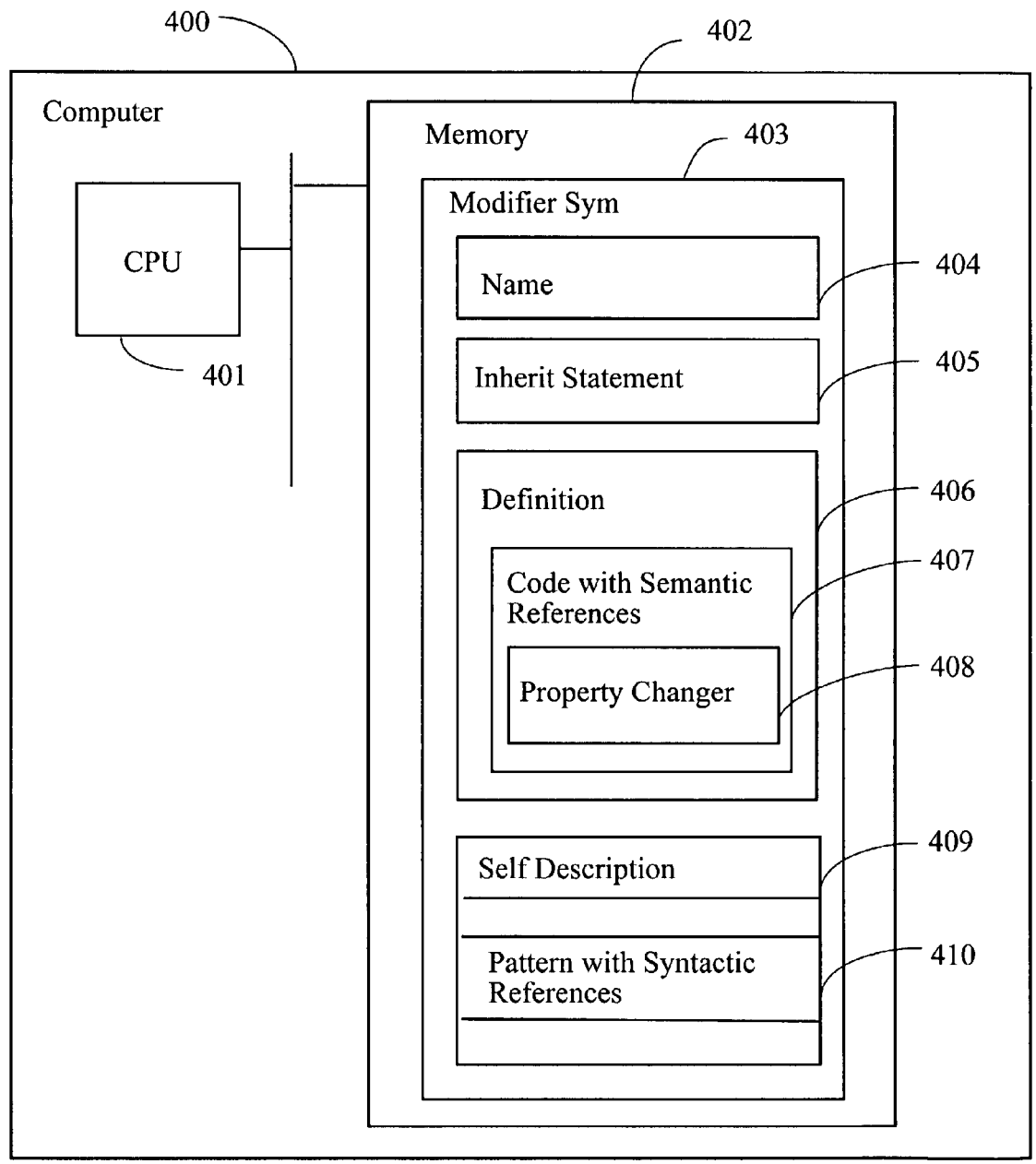
FIG. 4 is a block diagram of a computer system incorporating an embodiment of a Modifier Sym.
Figure 5:
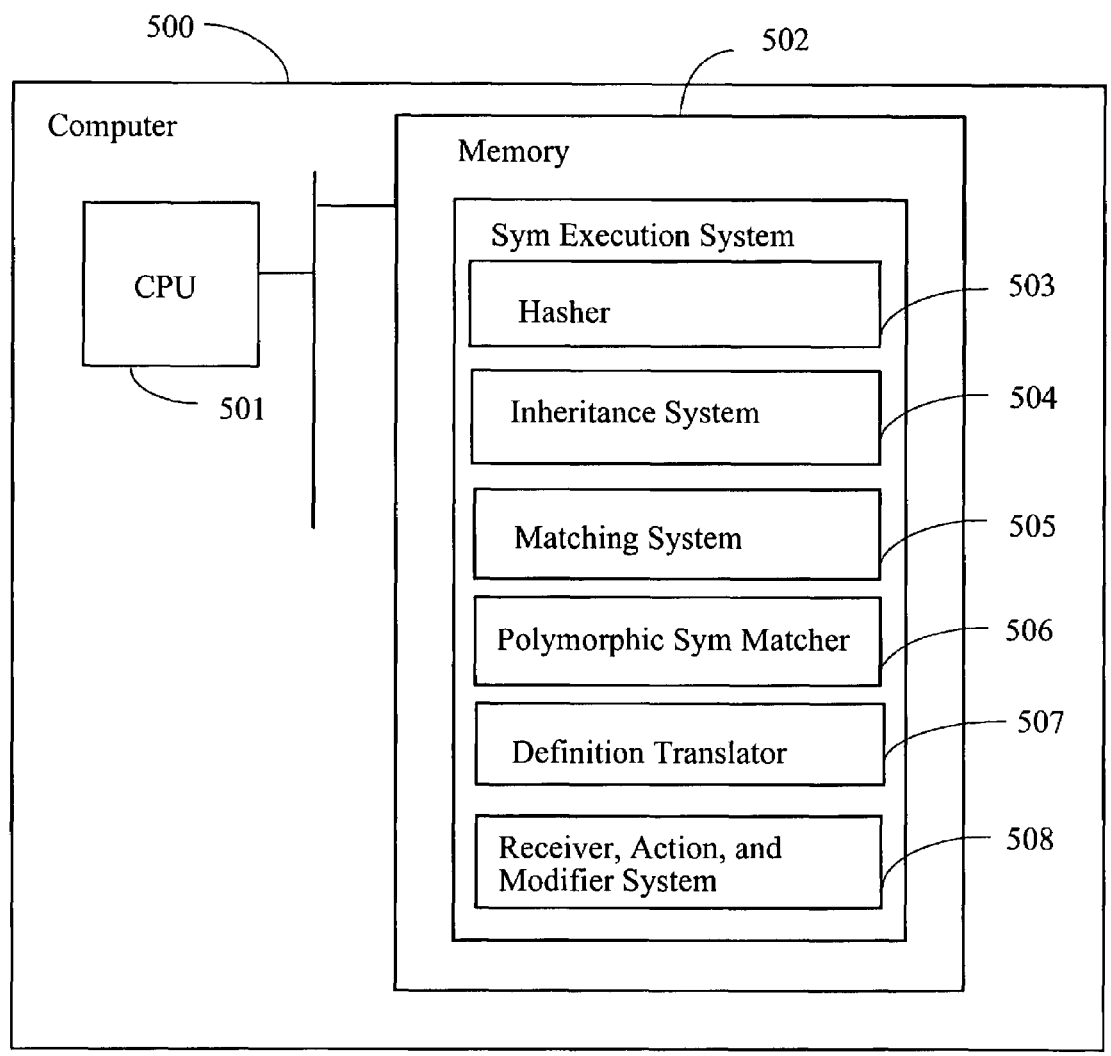
FIG. 5 is a block diagram of a computer system incorporating an embodiment of the Sym Execution System.

Architecture. The Sym-oriented programming model consists of a new fundamental unit of code called the Sym (FIG. 1) that couples syntactic and semantic relationships, and a method and system called the Sym Execution System (FIG. 5) for compiling Syms and programs written in Syms into executable code. In one embodiment, Syms are comprised of a Name 104, an Inherit Statement 105, a Self Description 108, and a Definition 106. In one embodiment of the system, there are three specialized forms of Syms: Receiver Syms (FIG. 2), Action Syms (FIG. 3), and Modifier Syms (FIG. 4). The Sym Execution System, in one embodiment shown in FIG. 5, is composed of a Hasher 503, an Inheritance System 504, a Matching System 505, a Polymorphic Sym Matcher 506, a Definition Translator 507, and a Receiver, Action, and Modifier Sym System 508.

Syntactic and semantic relationships are coupled in the present invention through the use of syntactic references in the patterns 109 of the Self Description 108 of a Syms and semantic references in the code 107 of a Sym Definition 106. The Self Description 108 of a Sym contains sets of Data Patterns 1201 and Syntactic Reference 1202 to other Syms. When a program written in Syms is run, the Self Description 108 of a Sym is matched against the program and the Syms referenced by the Self Description 108 are instantiated if they match the Input Data 601 of the program.

Figure 10:
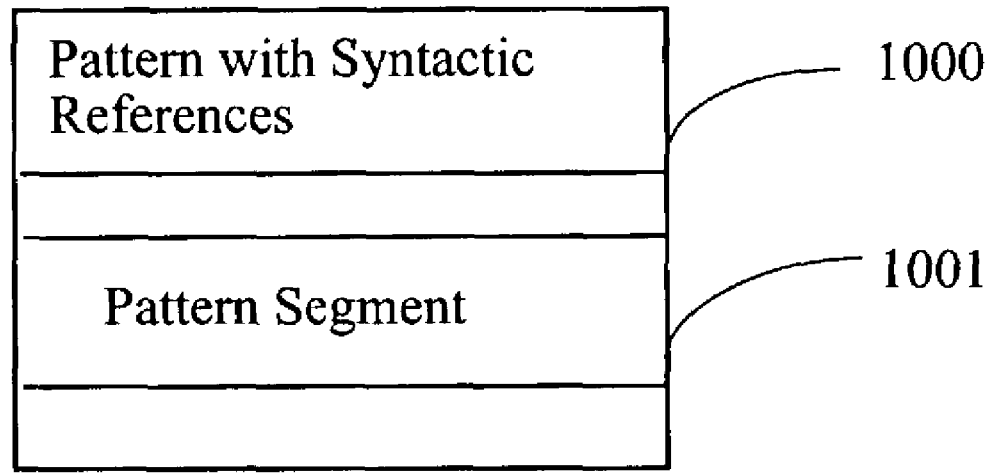
FIG. 10 is a block diagram representing an embodiment of a Pattern with Syntactic references.
Figure 11:
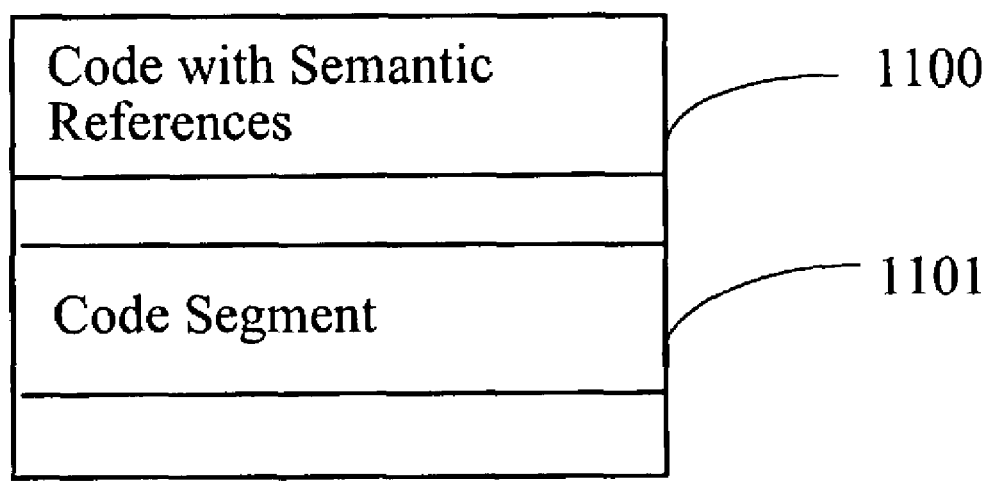
FIG. 11 is a block diagram representing an embodiment of Code with Semantic References.
Figure 12:
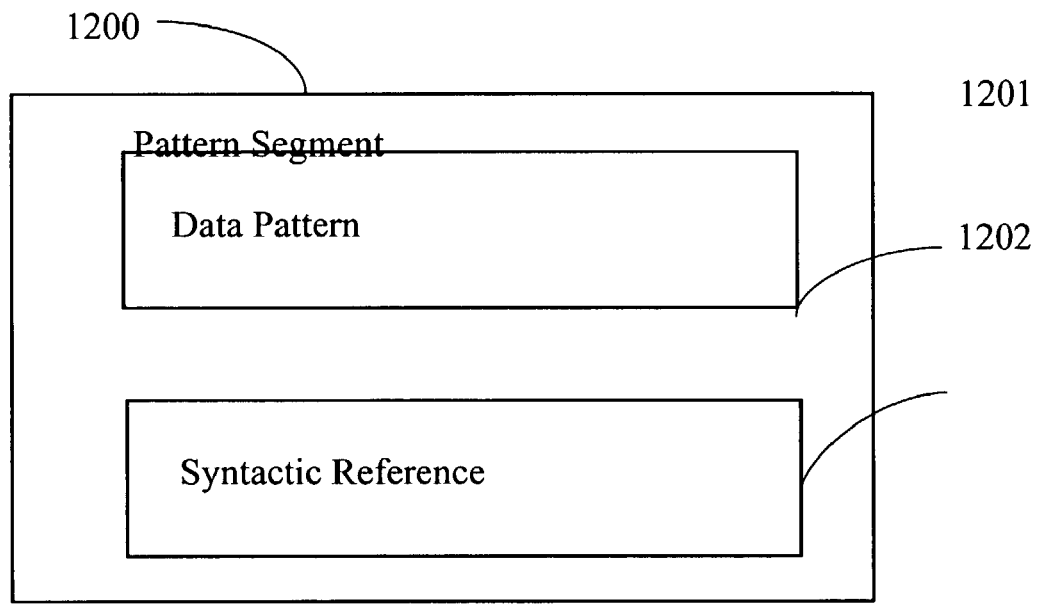
FIG. 12 is a block diagram representing an embodiment of a Pattern Segment.

With reference to FIG. 10, the Syntactic References in the Patterns 1000 create the syntactic relationships between Syms. When a Self Description 108 contains a Syntactic Reference 1202 to another Sym, as shown in FIG. 12, the second Sym's Pattern with Syntactic References 109 is matched when the Syntactic Reference 1202 in the first Sym is reached. If the second Sym's Pattern with Syntactic References 1000 matches when its Syntactic Reference 1202 in the first Sym's Self Description 108 is reached, it is also instantiated. If a Syntactic Reference 1202 to another Sym appears later in the Pattern with Syntactic References 1000, that Sym will also be matched and instantiated if successful. In this way, the order and position of the Syntactic Reference 1202 in a Pattern Segment 1200 defines the syntactic relationships between different Syms.

Figure 13:
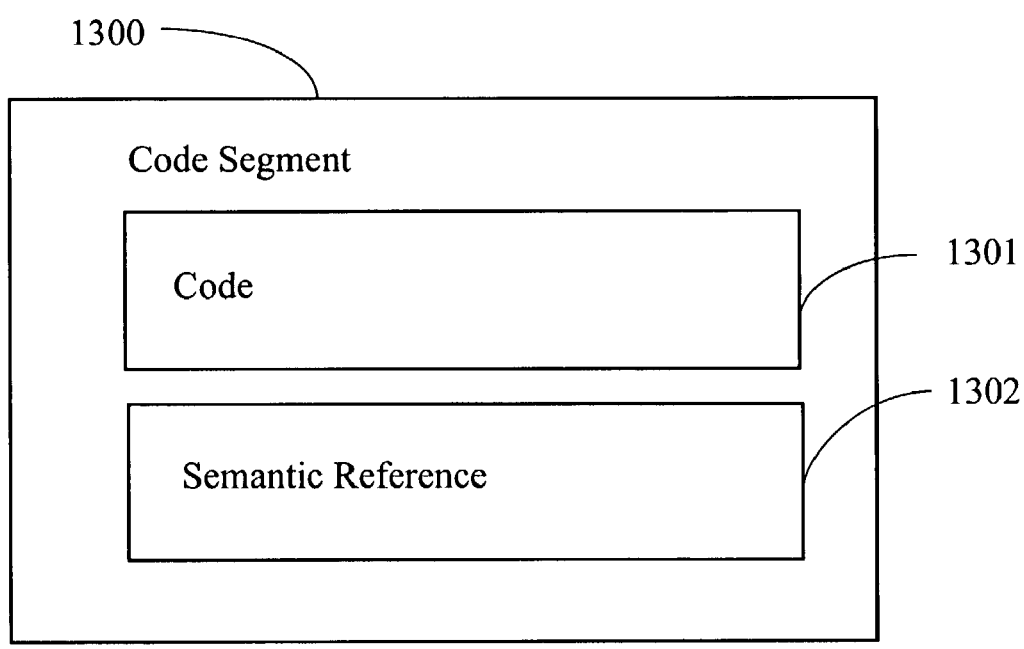
FIG. 13 is a block diagram representing an embodiment of a Code Segment.

With regard to FIG. 13, the Semantic Reference 1302 used by Code with Semantic References 107 in the Definition 106 of a Sym are references to the instantiated Syms that the Sym successfully matched in its Self Description 108. The code in the Definition then uses the Code with Semantic References 107 to define the meaning of the syntactic relationships between the different Syms. In one embodiment, the Semantic Reference 1302 is encapsulated in the Definition 106 of the Sym. This ensures that the only way that programmers can create semantic relationships between Syms is by creating syntactic relationships between them in a Sym's Self Description and then defining them in the same Sym's Definition. In this way, Syms enable the coupling of syntactic and semantic relationships. In one embodiment, this coupling is enforced.

Figure 2:
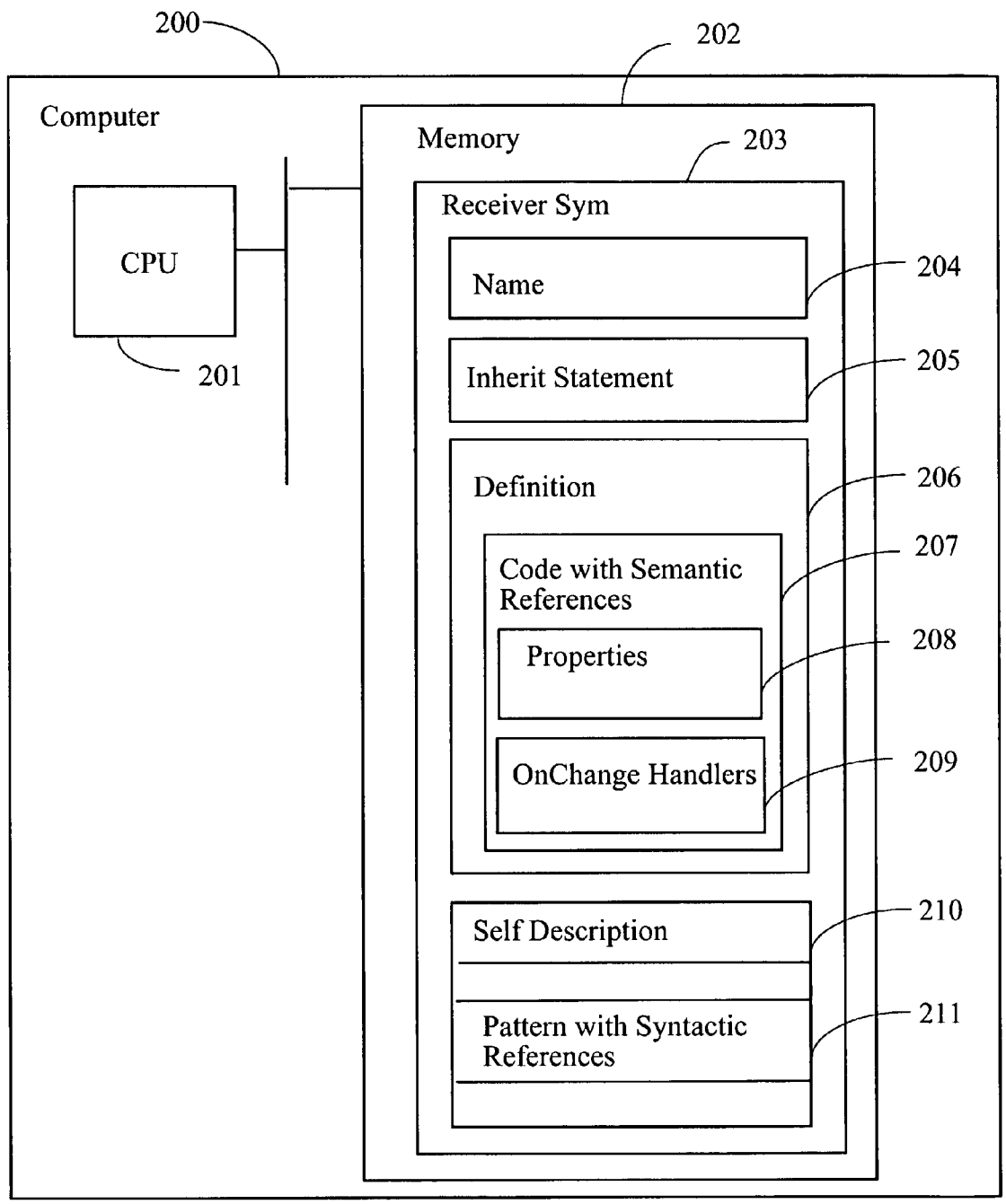
FIG. 2 is a block diagram of a computer system incorporating an embodiment of a Receiver Sym.

The combinatorics of Sym-oriented programming is increased through the use of specialized forms of Syms: Receiver Syms (FIG. 2), Action Syms (FIG. 3), and Modifier Syms (FIG. 4). In one embodiment, Receiver Syms (FIG. 2) only have Properties 208 and OnChange Handlers 209 in their Definitions. Action Syms (FIG. 3) have Properties 308 and a Property Changer 309 that can change the Properties 208 of Receiver Syms (FIG. 2). Modifier Syms (FIG. 4) have only a Property Changer 408 that can change the Properties 208 of Receiver Syms and the Properties 308 of Action Syms.

In one embodiment, the Sym Execution System (FIG. 5) implements the Inheritance System 504 and Matching System 505, the Hasher 503, the Polymorphic Sym Matcher 506, the Definition Translator 507, and the Receiver, Action, and Modifier System 508 by either directly running a Sym or a Program written in Syms or compiling it into another form. Those skilled in the art know that programming languages can be implemented in a number of ways. For example, they can be interpreted, compiled into an intermediate language, assembly language, machine language, or virtual machine code, or transformed into another source language. This patent covers these and any other techniques for transforming computer code that uses the methods described in the Sym Execution System.

An Embodiment of the Sym. In one embodiment, a Sym (FIG. 1) consists of a Name 104, an Inherit Statement 105, a Definition 106, and a Self Description 108. In an alternative embodiment, the Name is the primary Pattern with Syntactic References 109 expressed in the Self Description 108.

An Embodiment of the Name. A name is any unique identifier by which a Sym can be referenced. One embodiment of the Name 104 of the Sym is a text string in either UNICODE or ASCII format. Alternative embodiments include other text encodings, binary encodings, and encodings for other forms of input.

An Embodiment of the Self Description. In one embodiment, the Self Description 108 is extensible and contains Patterns with Syntactic References 109 that are matched against one or more inputs, where inputs are any data that can be processed by a computer. In one embodiment, the Syntactic Reference 1202 to other Syms in the Patterns with Syntactic References 109 is the Name 104 of the Syms being referenced. In an alternative embodiment, the Syntactic Reference 1202 is data that matches the primary patterns of the Syms being referenced. In one embodiment, Patterns with Syntactic References 109 in the Self Description 108 use mini-languages for the particular type of data that they are matching against. Those skilled in the art know that there can be different mini-languages for matching different types of data. Examples of this are regular expressions for matching text or a grid language for matching handwriting.

An Embodiment of the Inherit Statement. Inherit Statements have been used in computer science for over thirty years and those skilled in the art know that there can be many types of inheritance statements from single to multiple inheritance, from abstract to final. These and all other inherit statements are alternatives and equivalents. In one embodiment of the Inherit Statement 105, the specific syntactic and semantic relationships defined in the Definition 106 and Self Description 108 can be overridden with more specific versions. In addition, the Inherit Statement 105 can inherit from multiple Syms 103 and supports abstract inheritance. An Embodiment of the Semantic References. In one embodiment, the Semantic Reference 1302 to the Syms that are matched and used by Code with Semantic References 107 in the Definition 106 are available both as symbolic names and through method calls. In alternative embodiments they are available in a language described in Syms.

An Embodiment of the Definition. The Definition 106 of a Sym is its meaning. This meaning can be expressed either in the code of a programming language or in Syms. The former is well understood by those skilled in the art. The latter is accomplished by creating the Definition using a language that other Syms define. This process is explained in more detail below in one embodiment of the Definition Translator 507. In one embodiment, it is possible to express the Definition 106 both with the constructs from popular programming languages like Perl, Python, JAVA, C#, C++, etc. and in a language that other Syms define.

The code in the Definition uses the Semantic Reference in the Definition 106 to define semantic relationships between Syms. The Syms matched in a Sym's Self Description 108 are available as a Semantic Reference 1302 in its Definition 106. By performing operations on the Syms that the Semantic Reference 1302 provides access to, a programmer automatically couples syntactic and semantic relationships. In one embodiment, the system enforces this coupling by not providing external access to the Semantic Reference 1302 outside of the Definition 106.

An Embodiment of Receiver Syms, Action Syms, and Modifier Syms. In one embodiment of the system, there are three special types of Syms that are variants of generic Syms: Receiver Syms (FIG. 2), Action Syms (FIG. 3), and Modifier Syms (FIG. 4). These Syms are distinguished from each other by the types of Definitions 106 they have and the types of Syms on which these Definitions 106 operate.

As can be seen in FIG. 2, a Receiver Sym 203 is a Sym with Properties 208 and OnChange Handlers 209 in its Definition 206. Properties 208 are in the form of data, whereas OnChange Handlers 209 are units of code that are called when one of more Properties 208 specified by an OnChange Handler 209 changes. For example, the Receiver Sym "Balloon" might have Properties of size, pressure, and inflation and an OnChange handler that handled the case of when a needle was poked into it. As can be seen in FIG. 3, an Action Sym 303 is a Sym that changes the Properties of a Receiver Sym through a Property Changer 309. An Action Sym differs from traditional generic programming because it can also have Properties 308 that control the operations that it performs. For example, the Action Sym "Poke" might have a Property called strength that specified the strength of the Poke.

As can be seen in FIG. 4, a Modifier Sym 403 is a Sym that changes the Properties of Action Syms and Receiver Syms with a Property Changer 408. Thus, the Modifier Sym "weak" could modify the strength Property of the Action Sym "Poke." Or, alternatively, the Modifier Sym "Red" could modify the color Property of the Receiver Sym "Balloon." A Modifier Syms does not have any Properties.

The benefit of using Receiver Syms, Action Syms, and Modifier Syms is that they increase the combinatorics of the system, making it possible for programmers to more easily reuse work.

An Embodiment of the Sym Execution System. The Sym Execution System generates executable code from Syms and programs written in Syms. In one embodiment, the Sym Execution System consists of the following elements:

The Hasher 503 uses the Sym's Name or Pattern to determine where to store the Sym.

The Inheritance System 504 determines what Syms a Sym inherits from.

The Matching System 505 uses a Sym's Self Description to match the Sym against a program entered as Input Data 601.

The Polymorphic Sym Matcher 506 determines what Syms inherit from the Sym being compiled and then generates the code to match those Syms when the Sym being compiled is matched.

The Definition Translator 507 compiles the Sym's Definition to executable code.

The Receiver, Action, and Modifier System 508 creates all of the additional code and performs all of the additional safety checks needed for Receiver Syms, Action Syms, and Modifier Syms.

These elements work together in any order to transform programs written in Syms and Syms themselves into executable code.

An Embodiment of the Hasher. In one embodiment, the Hasher 503 creates and stores a unique identifier based on the Name 104 of the Sym. In the case where one or more Syms share the same Name 104, the Hasher creates unique identifiers for all of the Syms with the same Name 104. In one embodiment, unique identifies for Syms with the same Name 104 are created by appending a unique number to the result of the Hasher. In alternative embodiments, other randomly generated strings and information specific to the Syms can be used to distinguish them. The methods of implementing a Hasher are familiar to those skilled in the art.

An Embodiment of the Inheritance System. In one embodiment, the Inheritance System 504 reads the Inherit Statement 105 in a Sym and from that statement determines what Syms to inherit from and the order of inheritance from those Syms. The system then endows the Sym having the Inherit Statement 105 with the qualities of the Syms from which it inherits. In one embodiment, Syms inherit the syntactic and semantic relationships of their parent Sym. Those skilled in the art are familiar with the techniques by which this can be accomplished.

An Embodiment of the Matching System. In one embodiment, the Matching System 600 reads the Pattern with Syntactic References 109 in the Self Description 108 of a Sym and uses the Data Checker 602 to match the Input Data 601 against the Pattern with Syntactic References 109 for that data type. If the match is successful, the Matching System 600 instantiates the Sym with the Sym Instantiator 603 and creates Code with Semantic References 107 for its Definition 106 with the Semantic Reference Creator 604. The Matching System 600 then reads a file or other section of memory to determine if other Syms inherit from the Sym on which it is operating. If other Syms inherit from the Sym, then the Matching System 600 uses the Polymorphic Sym Matcher 700 to try to match those Syms. If any of the Syms that inherit from the Sym match, then the Sym itself is not matched.

Figure 6:
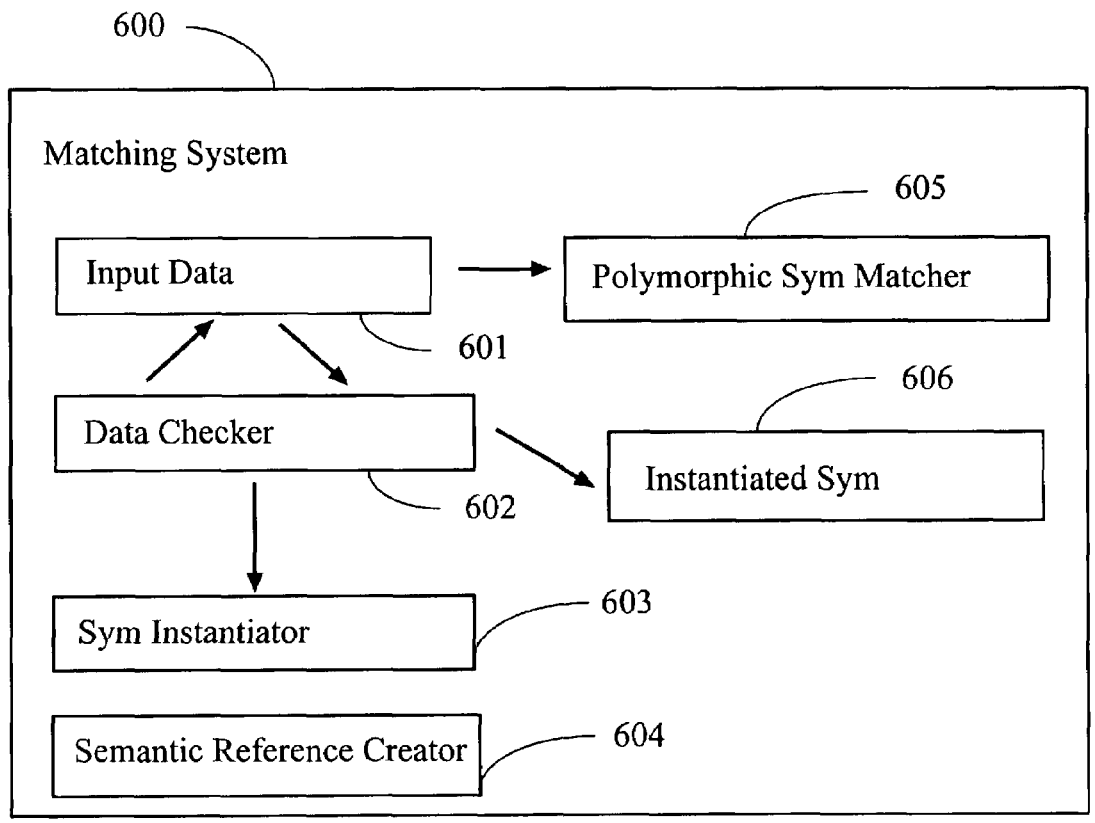
FIG. 6 is a block diagram representing an embodiment of the Sym Matching System.
Figure 7:
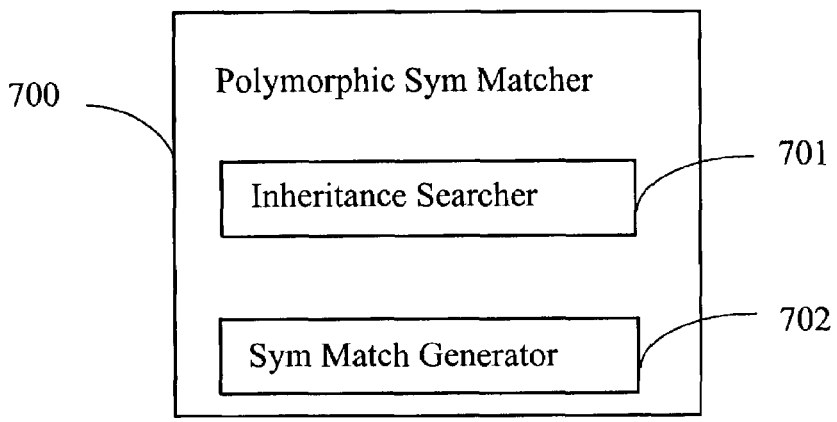
FIG. 7 is a block diagram representing an embodiment of the Polymorphic Sym Matcher.

An Embodiment of the Polymorphic Sym Matcher. In one embodiment, the Polymorphic Sym Matcher 700 ensures that when a Sym is matched against input data by the Matching System (FIG. 6) all child Syms that inherit from the parent Sym are matched as well. It does so by using the Inheritance Searcher 701 to determine what child Syms inherit from the parent Sym, and utilizes this information to match the child Syms against input data with the Sym Match Generator 702 whenever the Matching System 600 matches input data against the parent Sym. Finally, it sets a flag to ensure that if one of the child Syms matches, the parent Sym will not match. In one embodiment, the child Syms are matched before the parent Sym.

Figure 8:
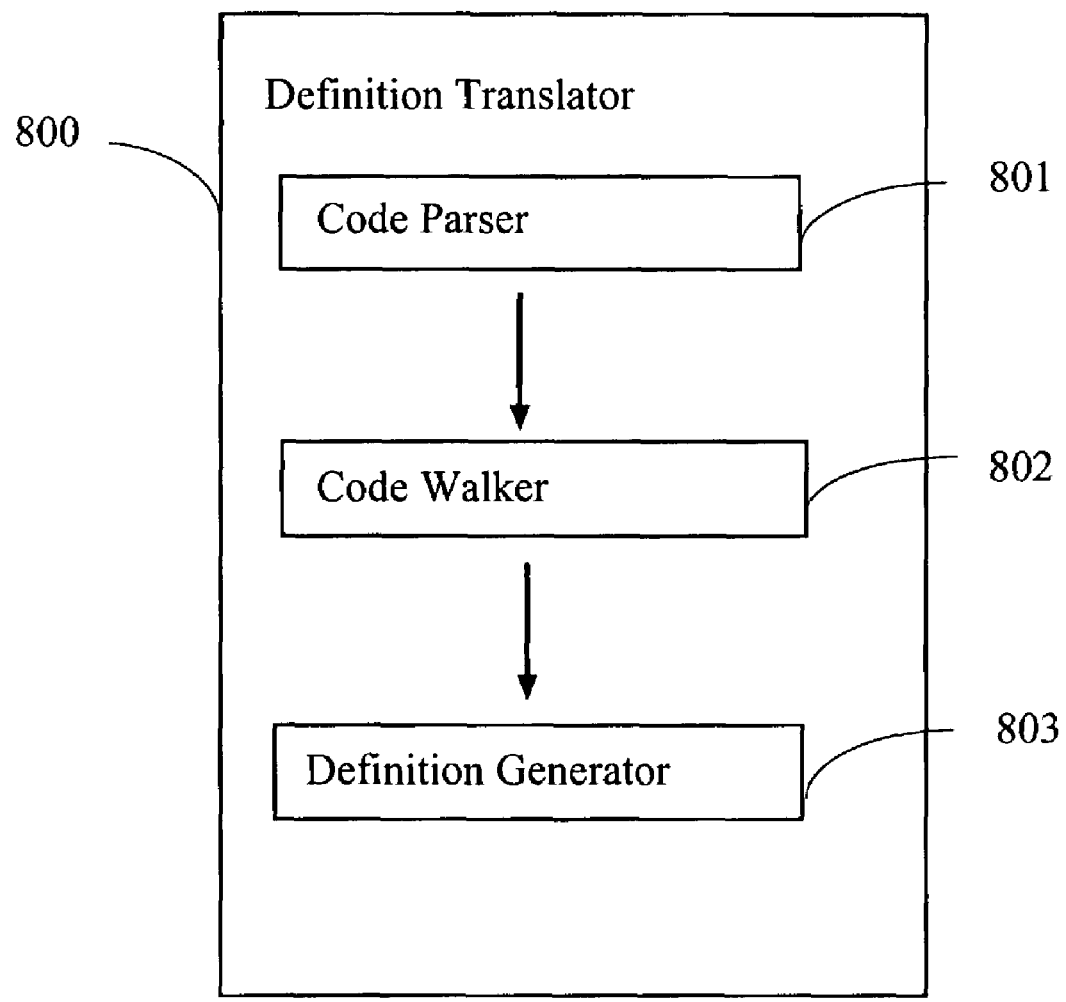
FIG. 8 is a block diagram representing an embodiment of the Definition Translator.

An Embodiment of the Definition Translator. The Definition Translator 800 (FIG. 8) reads the Definition 106 of a Sym, and if that Definition 106 is written in a programming language, it transforms the Definition 106 into executable code or runs it directly. If the Sym is defined by other Syms, it can either interpret those Syms at run-time or compile them directly. In one embodiment, the Definition Translator 800 uses the Code Parser 801 to preparse the Definition and then walks the parsed Definition with the Code Walker 802, in the process instantiating the Syms in the Definition. In this way the Definition Translator 800 eliminates the need for run-time parsing.

Figure 9:
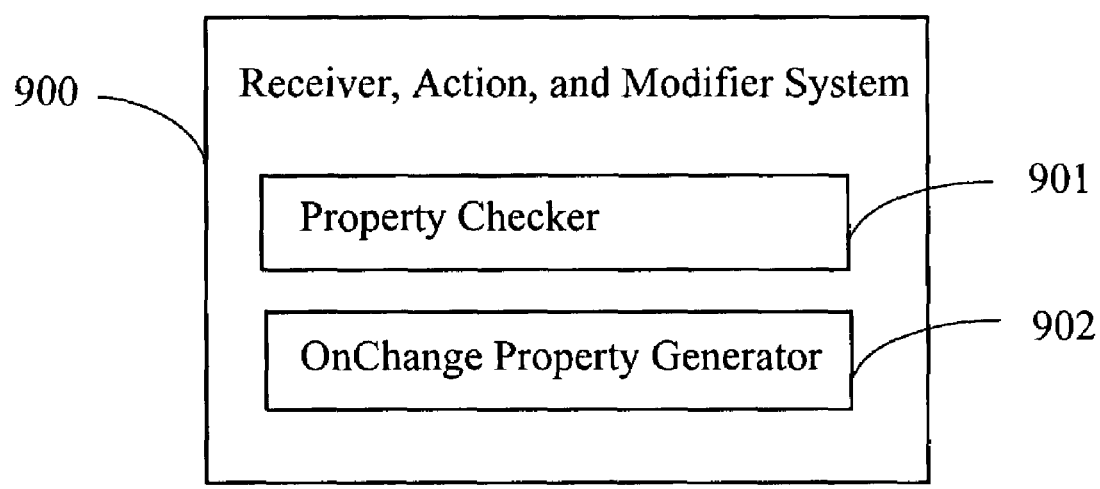
FIG. 9 is a block diagram representing an embodiment of the Receiver, Action, and Modifier Sym System.

An Embodiment of the Receiver, Action, and Modifier Sym System. The Receiver, Action, and Modifier System 900 (FIG. 9) creates all of the additional code and performs all of the additional safety checks needed for Receiver Syms (FIG. 2), Action Syms (FIG. 3), and Modifier Syms (FIG. 4). For Receiver Syms (FIG. 2) it uses the OnChange Property Generator 902 to create accessors to the Properties 208 that call the OnChange Handlers 209 whenever another Sym tries to change Properties 208 in the Receiver Sym 203.

For Action Syms (FIG. 3), the System uses the Property Checker 901 to verify at the time of execution or compilation that the Receiver Syms being operated on have the Properties 208 that the Action Sym changes in its Property Changer 309.

For Modifier Syms, the Property Checker 901 verifies at execution time that Properties 208 of Receiver Syms it tries to change are present and that the Properties 308 of Action Syms it tries to change are present.

In one embodiment, the Sym is state-based and the bidirectional coupling of the syntactic and semantic relationships is enforced and contiguous. In alternative embodiments, the Sym is not state-based, or the representations are not separated, or the coupling is simply bidirectional, or the coupling is not enforced.

ALTERNATIVE EMBODIMENTS

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and various embodiments with various modifications as are suited to the particular use contemplated. It is intended that the scope of the invention be defined by the Claims appended hereto and their equivalents.

What is claimed is:

1. A method in a computer system for generating runnable code, the method comprising:

describing in a first unit of code at least one legal relationship among a collection comprised of units of code and/or tokens;

encapsulating in the first unit of code at least one meaning comprised of a behavior and state or the at least one legal relationship among units of code and/or tokens in the collection;

allowing the at least one meaning to be accessed through the at least one legal relationship to compose at least part of a meaning of a second unit of code;

enabling an inheritance of at least part of the at least one legal relationship and meaning of the first unit of code;

generating runnable code based on the first and/or second unit of code.

2. The method of claim 1 further comprising:

attempting to match at least one legal relationship of the first unit of code if an attempt to match at least one legal relationship of at least one parent of the first unit of code occurs.

3. The method of claim 1 further comprising:

verifying and/or enforcing that the at least one meaning of the first unit of code is only accessed through a legal relationship of the first unit of code when used to compose at least part of the meaning of the second unit of code.

4. A method in a computer system for generating runnable code, the method comprising:

describing in a first part of a first unit of code at least one legal relationship among a collection comprised of units of code and/or tokens;

encapsulating in a second part of the first unit of code at least one meaning comprised of a behavior and state for the at least one legal relationship among units of code and/or tokens in the collection;

allowing the at least one meaning to be accessed through the at least one legal relationship to compose at least part of a meaning of a second unit of code;

enabling an inheritance of at least part of the at least one legal relationship and meaning of the first unit of code;

generating runnable code based on the first and/or second unit of code.

5. A method in a computer system for generating runnable code, the method comprising:

describing in a first unit of code for at least one input at least one legal relationship among a collection comprised of units of code and/or tokens;

encapsulating in the first unit of code at least one meaning comprised of a behavior and state for the at least one legal relationship among units of code and/or tokens in the collections;

allowing the at least one meaning to be accessed through the at least one legal relationship to compose at least part of a meaning of a second unit of code;

enabling an inheritance of at least part of the at least one legal relationship and meaning of the first unit of code;

generating runnable code based on the first and/or second unit of code.

6. A computer system for generating runnable code, comprising:

a first unit of code that comprises a description of at least one legal relationship among a collection comprised of units of code and/or tokens;

a definition in the first unit of code that encapsulates at least one meaning comprised of a behavior and state for the at least one legal relationship among units of code and/or tokens in the collection;

a translator that allows the at least one meaning to be accessed through the at least one legal relationship to compose at least part of a meaning of a second unit of code;

an inheritance svstetn that enables the inheritance of at least part of the at least one legal relationship and meaning of the first unit of code;

means for generating runnable code based on the first and/or second unit of code.

7. The computer system of claim 6 wherein the computer system attempts to match at least one legal relationship of the first unit of code if it attempts to match at least one legal relationship of at least one parent of the first unit of code.

8. The computer system of claim 6 wherein the computer programming system verifies and/or enforces a requirement that the at least one meaning of first unit of code is only accessed through legal relationship of the first unit of code when used to compose at least part of meaning of the second unit of code.

9. A computer system for generating runnable code, comprising:

a first unit of code having a first part and a second part, the first part describing at least one legal relationship among a collection comprised of units of code and/or tokens, and the second part encapsulating at least one meaning comprised of a behavior and state for the at least one legal relationship among units of code and/or tokens in the collection;

a translator that allows the at least one meaning to be accessed through the at least one legal relationship to compose at least part of a meaning of a second unit of code;

an inheritance system that enables the inheritance of at least part of the at least one legal relationship and meaning of the first unit of code;

means for generating runnable code based on the first and/or second unit of code.

10. A computer programming system, comprising:

a language comprised of a first unit of code that includes a description of at least one legal relationship among a collection comprised of units of code and/or tokens;

a definition in the first unit of code that encapsulates at least one meaning comprised of a behavior and state for the at least one legal relationship among units of code and/or tokens in the collection;

a translator that allows the at least one meaning to be accessed through the at least one legal relationship to compose at least part of a meaning of a second unit of code;

an inheritance system that enables the inheritance of at least part of the at least one legal relationship and meaning of the first unit of code;

a system for executing the first unit of code as at least part of meaning of the second unit of code.

11. The computer programming system of claim 10, wherein the computer programming system attempts to match at least one legal relationship of the first unit of code if it attempts to match at least one legal relationship of at least one parent of the first unit of code.

12. The computer programming system of claim 10, wherein the computer programming system verifies and/or enforces a requirement that the at least one meaning of the first unit of code is only accessed through a legal relation of the first unit of code when used to compose at least part of meaning of the second unit of code.

13. A computer programming system, comprising:

a language including a first unit of code, the first unit of code having a first part which describes at least one legal relationship among a collection comprised of units of code and/or tokens and the first unit of code having a second part that encapsulates at least one meaning comprised of behavior and state for the at least one legal relationship among units of code and/or tokens in the collection;

a translator that allows the at least one meaning to be accessed through the at least one legal relationship to compose at least part of a meaning of a second unit of code;

an inheritance system that enables the inheritance of at least part of the at least one legal relationship and meaning of the first unit of code;

a system for executing the first unit of code as at least part of the meaning of the second unit of code.

14. A computer programming system, comprising:

a language having a first unit of code that for at least one input includes a description of at least one legal relationship among a collection comprised of units of code and/or tokens;

a definition in the first unit of code that encapsulates at least one meaning comprised of a behavior and state for the at least one legal relationship among units of code and/or tokens in the collection;

a translator that allows the at least one meaning to be accessed through the at least one legal relationship to compose at least part of a meaning of a second unit of code;

an inheritance system that enables the inheritance of at least part of the at least one legal relationship and meaning of the first unit of code;

a system for executing the first unit of code as at least part of the meaning of the second unit of code.

15. A computer system for generating runnable code, comprising:
- a first unit of code that for at least one input includes a description of at least one legal relationship among a collection comprised of units of code and/or tokens;
- a definition in the first unit of code that encapsulates at least one meaning comprised of a behavior and state for the at least one legal relationship among units of code and/or tokens in the collection;
- a translator that allows the at least one meaning to be accessed through the at least one legal relationship to define at least part of a meaning of a second unit of code;
- an inheritance system that enables the inheritance of at least part of the at least one legal relationship and meaning of the first unit of code;
- means for generating runnable code based on the first and/or second unit of code.

* * * * *

UNITED STATES PATENT AND TRADEMARK OFFICE
CERTIFICATE OF CORRECTION

PATENT NO. : 7,080,352 B2  Page 1 of 1
APPLICATION NO. : 10/060433
DATED : July 18, 2006
INVENTOR(S) : Nile Josiah Geisinger It is certified that error appears in the above-identified patent and that said Letters Patent is hereby corrected as shown below:

Claim 1, Col. 10, line 36-39 should read
--encapsulating in the first unit of code at least one meaning comprised of a behavior and state or for the at least one legal relationship among units of code and/or tokens in the collection--

Claim 6, Col. 11, line 37-39 should read
--an inheritance system system that enables the inheritance of at least part of the at least one legal relationship and meaning of the first unit of code; means for generating runnable code based on the first and/or second unit of code--

Claim 8, Col. 11, line 46-51, to read as follows:
--The computer system of claim 6 wherein the computer programming system verifies and/or enforces a requirement that the at least one meaning of the first unit of code is only accessed through a legal relationship of the first unit of code when used to compose at least part of a meaning of the second unit of code.--

Claim 12, Col. 12, line 26-31 should read
--The computer programming system of claim 10, wherein the computer programming system verifies and/or enforces a requirement that the at least one meaning of the first unit of code is only accessed through a legal relation of the first unit of code when used to compose at least part of a meaning of the second unit of code.--

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO.         : 7,080,352 B2
APPLICATION NO.    : 10/060433
DATED              : July 18, 2006
INVENTOR(S)        : Nile Josiah Geisinger It is certified that error appears in the above-identified patent and that said Letters Patent is hereby corrected as shown below:

Claim 5, Col. 11, lines 13-16:
--encapsulating in the first unit of code at least one meaning comprised of a behavior and state for the at least one legal relationship among units of code ~~and/or~~ and or tokens in the collections~~;~~--

Signed and Sealed this

Fourteenth Day of August, 2007

JON W. DUDAS
*Director of the United States Patent and Trademark Office*